US006299798B1

(12) United States Patent
Guerin et al.

(10) Patent No.: US 6,299,798 B1
(45) Date of Patent: Oct. 9, 2001

(54) WATER-REDISPERSIBLE GRANULES INCLUDING A LIQUID ACTIVE MATERIAL

(75) Inventors: Gilles Guerin, Eaubonne; Mikel Morvan, Courbevoie, both of (FR)

(73) Assignee: Rhodia Chimi, Boulogne Billancourt (FR)

( * ) Notice: Subject to any disclaimer, the term of this patent is extended or adjusted under 35 U.S.C. 154(b) by 0 days.

(21) Appl. No.: 09/051,668

(22) PCT Filed: Oct. 23, 1996

(86) PCT No.: PCT/FR96/01654

§ 371 Date: Apr. 24, 1998

§ 102(e) Date: Apr. 24, 1998

(87) PCT Pub. No.: WO97/15386

PCT Pub. Date: May 1, 1997

(30) Foreign Application Priority Data

Oct. 25, 1989 (FR) .................................. 95 12586
Jan. 31, 1996 (FR) .................................. 96 01123

(51) Int. Cl.$^7$ .............................. C09K 3/00; B01F 17/00; B01F 17/56
(52) U.S. Cl. ...................... 252/363.5; 428/402; 428/403; 516/952
(58) Field of Search .................. 252/363.5; 428/402, 428/403; 515/952

(56) References Cited

U.S. PATENT DOCUMENTS 3,700,600 * 10/1972 Nagel et al. ........................ 510/374
4,844,734 * 7/1989 Iwasaki et al. ..................... 504/330
5,137,726 * 8/1992 Ogawa et al. ...................... 424/405
5,501,812 * 3/1996 Vermeer et al. .................... 510/153
5,516,747 * 5/1996 Lachut ................................ 504/116
5,840,547 * 11/1998 Rosenberg et al. ................ 435/71.2

FOREIGN PATENT DOCUMENTS 0 550 276 A1 * 7/1993 (EP) .

OTHER PUBLICATIONS

*Handbook of Chemistry and Physics*, 48th Edition, Weast, Robert C. p. C334, C337, C400, 1967.*

* cited by examiner

*Primary Examiner*—Jill Warden
*Assistant Examiner*—Cross LaToya
(74) *Attorney, Agent, or Firm*—Jean-Louis Seugnet

(57) ABSTRACT

Water-redispersible granules prepared by drying a water-in-oil emulsion including at least one active material in the form of a hydrophobic liquid; at least one water-soluble compound capable of forming, during the drying process, a solid continuous film in which droplets of the hydrophobic active material are trapped; water; and at least one main surfactant with a binary water-surfactant phase diagram comprising an isotropic phase which is fluid at 25° C. up to a surfactant concentration of at least 50% by weight, followed at higher concentrations by a hexagonal, cubic or lamellar liquid crystal phase that is stable at least up to 65° C.

20 Claims, No Drawings

WATER-REDISPERSIBLE GRANULES INCLUDING A LIQUID ACTIVE MATERIAL

This application is an application under 35 U.S.C. Section 371 of International Application Number PCT/FR96/01654, filed on Oct. 23, 1996.

The present invention relates to water-redispersible granules comprising an active ingredient in liquid form.

In some industries, such as the food, cosmetics or paint industries, formulations are prepared from active ingredients in the form of a hydrophobic liquid. One formulation possibility is to prepare oil-in-water emulsions of such ingredients.

However, such emulsions cause stability problems on storage. The phases of the emulsion constituents are seen to separate to a greater or lesser extent. Further, there may be problems with deactivation of the active ingredient to contend with, the active ingredient possibly degrading by hydrolysis during storage.

Finally, the fact that in order to be readily manipulatable and pumpable, such formulations must contain relatively low quantities of active ingredient and a large amount of water cannot be ignored.

The present invention aims to provide an original alternative to the problems mentioned above in that the formulations proposed are powders containing high concentrations of active ingredient initially in the form of a hydrophobic liquid.

Thus the invention provides water-redispersible granules, obtained by mixing then drying at least one active ingredient, at least one principal surfactant, and at least one hydrosoluble compound and comprising:
at least one active ingredient in the form of a hydrophobic liquid;
at least one principal surfactant for which the binary water-surfactant phase diagram comprises an isotropic phase which is fluid at 25° C. up to a concentration of at least 50% by weight of surfactant followed, at high concentrations, by a hexagonal, cubic or lamellar type liquid crystal phase which is stable up to 65° C.;
at least one hydrosoluble compound.

The invention also provides a process for preparing such granules consisting of carrying out the following steps:
preparing an emulsion of at least one active ingredient, at least one principal surfactant, and at least one hydrosoluble compound;
drying the emulsion obtained.

More particularly, the invention provides water-redispersible granules obtained by drying an oil-in-water emulsion comprising:
at least one active ingredient in the form of a hydrophobic liquid;
at least one hydrosoluble compound which can form a continuous solid film during drying which traps droplets of the hydrophobic active ingredient;
water
and at least one principal surfactant in which the binary water-surfactant phase diagram comprises an isotropic phase which is fluid at 25° C. up to a concentration of at least 50% by weight of surfactant followed, at high concentrations, by a hexagonal, cubic or lamellar type liquid crystal phase which is stable up to 65° C.

The granules of the present invention have a number of advantages.

Firstly, their conformation can avoid all of the problems of using emulsions. Thus problems of instability on storage are avoided, such as creaming, flocculation, ageing and coalescence. These different phenomena have been described in the "ENCYCLOPEDIA OF EMULSIONS TECHNOLOGY", volume 1, by Paul BECHER published by MARCEL DEKKER INC., 1983.

A further advantage of the present invention is that the concentrations of active ingredients can be very high compared with emulsions. As a result, during use of these granules, a smaller quantity of granules will suffice.

Further, the conformation of the invention can overcome the problem of deactivation of the active ingredient when it is sensitive to hydrolysis.

The present invention can also provide a pre-formulation in the form of granules which are thus easier to use than emulsions, for example in the case where the pre-formulation is added to a powder formulation.

Further, the granules of the invention, prepared from an emulsion, have the advantage of redispersing spontaneously in water, to produce again an emulsion with a granulometry close to that of the initial emulsion.

Finally, the present invention provides a solution to the problems of liquid product conformations which are normally formulated by absorption on a support. The concentration of active ingredient in such formulations is often low and there may be phase separation between the support and the active ingredient by migration of the active ingredient during storage.

Further advantages and characteristics will become clearer from the following description and examples.

As indicated above, the granules of the invention comprise at least one active ingredient in the form of a hydrophobic liquid.

All active ingredients are suitable provided that at ambient temperature they are in the form of a liquid which is non miscible in or very slightly miscible with water or are dissolved in an organic solvent.

The term "slightly miscible" means active ingredients or solvents with a solubility in water not exceeding 10% by weight.

The term "active ingredient" means either pure active ingredient or active ingredient dissolved in a solvent, or a solvent.

Examples of active ingredients in the food industry are mono-, di- and tri-glycerides, essential oils, flavourings, and colorants.

Examples of active ingredients in the cosmetics industry are silicone oils, for example from the dimethicone family.

Examples of active ingredients suitable for implementing the invention in the paint industry are alkyd resins, epoxy resins, and block or non blocked isocyanates.

In the paper industry, examples are sizing resins and water repelling resins such as alkylketene dimer (AKD) or alkenyl succinic anhydride (ASA).

In the detergent industry, antifoaming agents can be mentioned as active ingredients, such as:
saturated or unsaturated aliphatic, alicyclic, aromatic or heterocyclic hydrocarbons, such as paraffins or waxes;
monostearylphosphates, monostearyl alcohol phosphates;
polyorganosiloxane oils or resins which may be combined with silica particles.

It is also possible to use active ingredients such as lubricants for working or deforming materials.

When the active ingredient is a solvent or a mixture of solvents, solvents are used which are non miscible in or slightly miscible with water, as defined above. Solvents which can be used are those used for cleaning or stripping, such as aromatic petroleum cuts, terpene compounds such as D-limonene, or L-limonene, also solvents such as SOLVESSO®. Aliphatic esters such as methyl esters of a mixture of acetic, succinic and glutaric acids (the acid mixture is a by-product of Nylon synthesis), oils such as vaseline oil, and chlorinated solvents are also suitable as solvents.

This list is, of course, given by way of indication only and is not exhaustive.

As indicated above, the active ingredients can be used as they are or in the presence of an organic solvent. More particularly, this solvent is selected from products which are insoluble in or slightly miscible with water.

Examples are mineral oils, or mono-, di- and tri-glycerides of saturated or unsaturated fatty acids; they may be natural or synthetic triglycerides, aromatic petroleum cuts, terpene compounds (D-limonene, L-limonene), aliphatic esters or chlorinated solvents.

The redispersible granules of the invention also comprise at least one principal surfactant in which the binary water-surfactant phase diagram comprises an isotropic phase which is fluid at 25° C. up to a concentration of at least 50% by weight of surfactant followed, at high concentrations, by a hexagonal, cubic or lamellar type liquid crystal phase which is stable up to 65° C.

The description of these phases is given, for example, in the publication by R. G. LAUGHLIN entitled "THE AQUEOUS BEHAVIOUR OF SURFACTANTS"—ACADEMIC PRESS—1994. Their identification by (X and neutron) ray diffusion is described in the publication by V. LUZZATI entitled "BIOLOGICAL MEMBRANES, PHYSICAL FACT AND FUNCTION"—ACADEMIC PRESS—1968.

More particularly, the liquid crystal phase of the principal surfactant is stable up to a temperature of at least 60° C. In a preferred implementation of the invention, the liquid crystal phase is stable up to a temperature of at least 55° C.

It should be noted here that the isotropic fluid phase can be cast, while the liquid crystal phase cannot be cast.

The principal surfactant can be a non ionic or ionic type.

In a first implementation of the invention, principal surfactants are used which have a binary phase diagram as described above and selected from ionic glycolipid surfactants.

Of the ionic glycolipid surfactants, uronic acid derivatives are particularly used.

Uronic acids corresponding to the following general formula represent a particularly advantageous implementation of the invention:

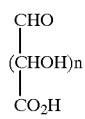

where n is a whole number between 1 and 4.

Particular examples of compounds of this type are galacturonic, glucuronic, D-mannuronic, L-iduronic and L-gulruonic acids, without in any way being limited to these acids.

The hydrocarbon chain of the surfactant, which may or may not be substituted, is a saturated or unsaturated chain containing 6 to 24 carbon atoms, preferably 8 to 16 carbon atoms.

More particularly, compounds deriving from galacturonic and glucuronic acids can be used. These products, and a process for their preparation, are described in European patent application EP-A-0 532 370.

In a preferred implementation of the invention, the principal surfactant is a derivative of galacturonic acid in its salt form.

More particularly, the hydroxyl group carried by the carbon bonded to the endocyclic oxygen is replaced by an OR group where R represents a linear or branched alkyl radical containing 9 to 22 carbon atoms.

Further, the counter-ion of the salt of the surfactant is an alkali metal, an alkaline-earth metal or a quaternary ammonium group in which the radicals bonded to the nitrogen atoms, which may be identical or different, are selected from hydrogen or an alkyl or hydroxyalkyl radical containing 1 to 6 carbon atoms.

In a second preferred implementation of the present invention, an amphoteric type principal surfactant is used.

More particularly, amphoteric surfactants suitable for carrying out the invention have the following general formula:

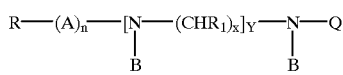

where R represents an alkyl or alkenyl radical containing 7 to 22 carbon atoms, $R_1$ represents a hydrogen atom or an alkyl radical containing 1 to 6 carbon atoms, A represents a (CO) or ($OCH_2CH_2$) group, n is 0 or 1, x is 2 or 3, y is 0 to 4, Q represents a radical $R_2$—COOM where $R_2$ represents an alkyl radical containing 1 to 6 carbon atoms, M represents a hydrogen atom, an alkali metal, an alkaline-earth metal or a quaternary ammonium group in which the radicals bonded to the nitrogen atom, which may be identical or different, are selected from hydrogen or an alkyl or hydroxyalkyl radical containing 1 to 6 carbon atoms, and B represents H or Q.

Preferably, M represents a hydrogen, sodium, or potassium atom or an $NH_4$ group.

In a particular embodiment, surfactants of this type comprising at least two carboxyl groups are used. Thus, more particularly, B represents a radical Q.

The acid function of these compounds can be in its acid form, or partially or completely in its salt form.

Of surfactants corresponding to the preceding formula, amphoteric derivatives of alkyl polyamines are particularly used, such as AMPHIONIC XL®, MIRATAINE H2C-HA® sold by Rhone-Poulenc and AMPHOLAC 7T/X® and AMPHOLAC 7C/X®, sold by Berol Nobel.

In a third implementation, a non ionic principal surfactant the hydrophilic part of which contains one or more saccharide unit(s), is used.

The saccharide units generally contain 5 or 6 carbon atoms. They can be derived from sugars such as fructose, glucose, mannose, galactose, talose, gulose, allose, altose, idose, arabinose, xylose, lyxose and/or ribose.

Among these surfactants with a saccharide structure, alkylpolyglycosides can be mentioned. They can be obtained by condensation (for example by acid catalysis) of glucose with primary fatty alcohols (U.S. Pat. Nos. 3,598,865; and 4,565,647; European patent EP-A-0 132 043; EP-A-0 132 046; Tenside Surf. Det. 28, 419, 1991,3; Langmuir 1993, 9, 3375–3384 . . . ) with a $C_4$–$C_{20}$ alkyl group, preferably $C_8$–$C_{18}$, and an average number of glucose units of the order of 0.5 to 3, preferably of the order of 1.1 to 1.8, per mole of alkylpolyglycoside (APG); in particular, those with:

a $C_8$–$C_{14}$ alkyl group and an average 1.4 glucose units per mole;

a $C_{12}$–$C_{14}$ alkyl group and an average 1.4 glucose units per mole;

a $C_8$–$C_{14}$ alkyl group and an average 1.5 glucose units per mole;

a $C_8$–$C_{10}$ alkyl group and an average 1.6 glucose units per mole;

sold respectively under the trade names GLUCOPON 600 EC®, GLUCOPON 600 CSUP®, GLUCOPON 650 EC® GLUCOPON 225 CSUP® sold by HENKEL.

The principal surfactants which have been described can be used alone.

However, the present invention also encompasses the use of a plurality of surfactants, which may or may not be in the same category.

The redispersible granules of the invention also comprise at least one hydrosoluble compound.

More particularly, the hydrosoluble compounds are selected from mineral species such as alkali metal silicates, and alkali metal polymetaphosphates.

The most advantageous silicates for this type of application are those with a $SiO_2/M_2O$ molar ratio in the range 1.6 to 3.5 with M representing a sodium or potassium atom.

A particular example of a polymetaphosphate is sodium hexametaphosphate.

The hydrosoluble compounds can also be selected from organic species such as urea, sugars and their derivatives.

Of the sugars and their derivatives, oses (or monosaccharides), osides, and highly depolymerised polyholosides can be mentioned. These are compounds with a mass average molecular mass which is more particularly less than 20000 g/mole.

Aldoses such as glucose, mannose, galactose and ketoses such as fructose are examples of oses which are suitable for use in the present invention.

Osides are compounds which results from self-condensation, with elimination of water, of ose molecules or of condensation of ose molecules with non glucidic molecules. Of the osides, holosides are preferable which are formed by a union of exclusively glucidic units and in particular oligoholosides (or oligosaccharides) which contain only a small number of these units, i.e., a number which is generally 10 or less. Examples of oligoholosides are saccharose, lactose, cellobiose and maltose.

Suitable highly depolymerised polyholosides (or polysaccharides) have been described, for example, in the publication by P. ARNAUD entitled "Cours de Chimie Organique" ["A Course of Organic Chemistry"], GAUTIER-VILLARS, editors, 1987. More particularly, polyholosides are used with a mass molecular mass which is more particularly below 20000 g/mole.

Non limiting examples of highly depolymerised polyholosides are dextran, starch, xanthane gum and galactomannanes such as guar or carouba. These polysaccharides preferably have a melting point of over 100° C. and a solubility in the range 50 to 500 g/l in water.

Also suitable are organic polyelectrolytes from polymerising monomers with the following general formula:

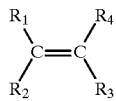

in which formula $R_1$, which may be identical or different, represents H, $CH_3$, $CO_2H$, $(CH_2)_nCO_2H$ where n=0 to 4.

Non limiting examples are acrylic acid, methacrylic acid, maleic acid, fumaric acid, itaconic acid, and crotonic acid. Copolymers obtained from monomers with the above general formula and those obtained using these monomers and other monomers, in particular vinyl derivatives such as vinyl alcohols and vinyl amides such as vinylpyrrolidinone are also suitable. Copolymers obtained from alkyl vinyl ether and maleic acid and those obtained from vinyl styrene and maleic acid, as described in the KIRK-OTHMER encyclopaedia entitled "ENCYCLOPEDIA OF CHEMICAL TECHNOLOGY" Volume 18—$3^{rd}$ edition, Wiley Interscience publication, 1982, can also be cited.

Peptide polymers derived from polycondensation of amino acids, in particular aspartic acid and glutamic acid or precursors of diaminoacids are also suitable. These polymers can also be homopolymer hydrolysates derived from aspartic acid or glutamic acid and copolymers derived from aspartic acid and glutamic acid in any proportions, or copolymers derived from aspartic and/or glutamic acid and other amino acids. Examples of copolymerisable amino acids are glycine, alanine, leucine, isoleucine, phenylalanine, methionine, histidine, proline, lysine, serine, threonine, cysteine.

Preferred polyelectrolytes have a low degree of polymerisation. More particularly, the mass molecular mass of the polyelectrolytes is below 20000 g/mole. It is preferably in the range 1000 to 5000 g/mole.

Different types of hydrosoluble compounds can, of course, be used in combination.

In a second variation of the invention, the hydrosoluble compound is selected from the principal surfactants. The description in this regard will not be repeated here.

The redispersible granules of the present invention can also contain a supplemental ionic surfactant.

More particularly, the supplemental ionic surfactants can be amphoteric surfactants, such as alkyl betaines, alkyldimethyl betaines, alkylamidopropyl betaines, alkylamidopropyldimethyl betaines, alkyltrimethyl sulphobetaines, imidazoline derivatives such as alkylamphoacetates, alkylamphodiacetates, alkylamphopropionates, alkylamphodipropionates, alkylsultains or alkylamidopropyl hydroxysultains, or the condensation products of fatty acids and protein hydrolysates.

Supplemental anionic surfactants can also be used, such as hydrosoluble salts of alkylsulphates, alkylethersulphates, alkylisethionates and alkyltaurates or their salts, alkylcarboxylates. alkylsulphosuccinates or alkylsuccinamates, alkylsarcosinates, alkylated derivatives of protein hydrolysates. acylaspartates, and alkyl and/or alkylether and/or alkylarylether ester phosphates. The cation is generally an alkali or alkaline-earth metal such as sodium, potassium, lithium, magnesium or an ammonium group $NR_4^+$ where R, which may be identical or different, represents an alkyl radical which may or may not be substituted by an oxygen or nitrogen atom.

It is possible to add any conventional additive to the redispersible granules of the invention, depending on the field of application of the latter.

As indicated above, the redispersible granules of the invention have high quantities of active ingredient.

The quantity of active hydrophobic ingredient represents at least 20% by weight of the granule; it is preferably in the range 40 to 90 parts by weight per 100 parts by weight in the granule.

In a particular implementation of the invention, the quantity of active ingredient is over 50 parts by weight. This content is preferably at least 70 parts by weight.

The quantity of principal surfactant is in the range 1 to 40 parts by weight, preferably in the range 1 to 30 parts by weight per 100 parts by weight of granule.

The quantity of hydrosoluble compound is between 7 and 50 parts by weight in the granule. In a particular variation, this quantity is in the range 8 to 30 parts by weight.

The ratio of the concentrations of principal surfactant to the hydrosoluble compound is in the range 20/80 to 90/10 by weight.

If they are identical, i.e., if the granules of the invention comprise at least one principal surfactant acting both as the surfactant and as the hydrosoluble compound, the total quantity of this compound corresponds, of course, to the sum of the two above ranges.

When the redispersible granules of the invention comprise at least one supplemental surfactant, the ratio of concentrations between the principal surfactant and the supplemental surfactant is in the range 5 to 10.

A process for preparing the redispersible granules will now be described.

As indicated above, the process consists, in a first step, of preparing an emulsion in water of at least one active ingredient, at least one principal surfactant and at least one hydrosoluble compound.

The emulsion can also comprise at least one supplemental surfactant if such a compound is used.

Clearly, when conventional additives are used, they can be added during formation of the emulsion.

Any of the emulsion forming methods known to the skilled person and described in the "ENCYCLOPEDIA OF EMULSIONS TECHNOLOGY", volumes 1 to 3, by Paul BECHER published by MARCEL DEKKER INC., 1983, can be used.

Thus a direct phase emulsification method is suitable for preparing the granules of the invention. Briefly, this method consists of preparing a mixture containing water and the surfactant(s), including the hydrosoluble compound, then introducing the active ingredient in liquid form, with stirring.

A further suitable method is reverse phase emulsification. This involves mixing the active ingredient with the principal surfactant and introducing, drop by drop and with stirring, water which can contain the other constituents such as the hydrosoluble solid, for example. Once the quantity of water introduced passes beyond a certain point, the emulsion reverses. Thus a direct oil-in-water emulsion is obtained. The emulsion obtained is then diluted in water to obtain the appropriate volume fraction of dispersed phase.

Finally, the emulsion can be prepared using colloidal mills such as the MENTON GAULIN and MICROFLUIDIZER (MICROFLUIDICS).

The average granulometry of the emulsion is generally in the range 0.1 to 10 micrometers, preferably 0.2 to 5 micrometers.

In a preferred variation of the invention, a mixture comprising water and the hydrosoluble compound (pre-emulsion) is first prepared.

Emulsification can be carried out at a temperature close to ambient temperature, although lower temperatures or higher temperatures can be envisaged.

The quantity of dry matter in the emulsion is generally in the range 10% to 70% by weight, preferably in the range 40% to 60% by weight.

The respective contents of the various constituents are selected so that the dry granules have the composition defined above.

The second step of the preparation process of the invention consists of drying the emulsion formed to obtain granules.

The method used to eliminate the water from the emulsion and obtain granules can be carried out using any means known to the skilled person. However, in a particular implementation of the invention a rapid drying method is used for the emulsion.

A suitable technique is freeze drying, which corresponds to a freezing step followed by a sublimation step, or by spray drying.

These drying modes, in particular the latter, are particularly suitable as they can preserve the emulsion as it stands and produce granules directly.

Spray drying can be carried out normally, in any known apparatus such as a spray tower which combines spraying carried out via a nozzle or turbine with a stream of hot gas, under conditions such that the temperature of the product during drying is at least 55° C.

It should be noted that additives such as anti-clogging agents can be incorporated into the granules at the second drying step. It is recommended that a filler be used, selected from calcium carbonate, barium sulphate, kaolin, silica, bentonite, titanium oxide, talc, hydrated alumina and calcium sulphoaluminate.

The following non limiting examples will now be described.

EXAMPLE 1

An emulsion was prepared with the following composition:

| Composition | % by weight |
|---|---|
| Vaseline oil | 36 |
| Sodium decyl D-galactoside uronate* | 4 |
| Water | 50 |

*Sodium decyl D-galactoside uronate is sold by ARD.

The binary water/surfactant phase diagram comprised a fluid isotropic phase at 25° C. up to a concentration of 60% by weight of surfactant followed by a hexagonal liquid crystal phase. This hexagonal phase has been identified and characterized by small angle X ray diffusion, in accordance with the publication by V. LUZZATI entitled "BIOLOGICAL MEMBRANES, PHYSICAL FACT AND FUNCTION", from an aqueous solution containing 62% by weight of surfactant. The small angle X ray diffusion spectrum contained two fine lines with Bragg spacing in the ratio $1:1/(3)^{1/2}$. The lattice parameter obtained by measuring the line spacing was 47 Angstroms.

A pre-emulsion was formed using an ULTRA-TURRAX® (IKA) by introducing the vaseline oil into water containing the surfactant. The emulsion was then introduced into a MICROFLUIDIZER-M110T® colloidal mill.

The average size of the emulsion, measured using a SYMPATEC® laser granulometer, was 0.5 micrometers.

The resulting emulsion was dried in a BUCHI® laboratory spray drier with a gas inlet temperature of 110° C.

Granules were obtained containing 90% by weight of oil.

Bringing the granules into contact with water caused them to disperse spontaneously and form an emulsion which after microscopic examination, had a granulometry which was close to that of the starting emulsion.

EXAMPLE 2

An emulsion was prepared with the following composition:

| Composition | % by weight |
|---|---|
| Vaseline O#1 | 36 |
| Alkyl polyaminocarboxylate* | 14 |
| Water | 50 |

*Alkyl polyaminocarboxylate is sold under the trade name AMPHIONIC XL by Rhone-Poulenc.

This surfactant was in solution in water and had a dry extract of 40% by weight. The binary water/surfactant phase diagram had a fluid isotropic phase at 25° C. up to a concentration of 50% by weight of surfactant, followed by an optically isotropic cubic type liquid crystal phase. This phase was identified and characterized by small angle X ray diffusion in an aqueous solution containing 52% of surfactant. The small angle X ray diffusion spectrum contained a series of five characteristic lines.

A pre-emulsion was formed using an ULTRA-TURRAX® emulsifier by introducing the vaseline oil into water containing the surfactant. The emulsion was then introduced into a MICROFLUIDIZER-M110T® colloidal mill.

The resulting emulsion was dried in a BUCHI® laboratory spray drier with a gas inlet temperature of 110° C.

Granules were obtained containing 86.5% by weight of oil.

Bringing the granules into contact with water caused them to disperse spontaneously and form an emulsion which after microscopic examination, had a granulometry which was close to that of the starting emulsion.

EXAMPLE 3

An emulsion was prepared with the following composition:

| Composition | % by weight |
|---|---|
| Vaseline oil | 32 |
| Sodium decyl D-galactoside uronate* | 1.6 |
| Lactose | 6.4 |
| Water | 60 |

*Sodium decyl D-galactoside uronate is sold by ARD.

A pre-emulsion was formed using an ULTRA-TURRAX® by introducing the vaseline oil into water containing the surfactant and the oligosaccharide. The emulsion was then introduced into a MICROFLUIDIZER-M110T® colloidal mill.

The resulting emulsion was dried in a BUCHI® laboratory spray drier with a gas inlet temperature of 110° C.

Granules were obtained containing 80% by weight of oil.

Bringing the granules into contact with water caused them to disperse spontaneously and form an emulsion which after microscopic examination, had a granulometry which was close to that of the starting emulsion.

EXAMPLE 4

An emulsion was prepared with the following composition:

| Composition | % by weight |
|---|---|
| SILICONE OIL 47V30 ® | 33.3 |
| Sodium decyl D-galactoside uronate* | 1.7 |
| Urea | 1.7 |
| Sodium silicate | 13.3 |
| Water | 50 |

The sodium silicate had a $SiO_2/Na_2O$ ratio of 2. It was in solution in water (dry extract 45% by weight).

A pre-emulsion was formed using an ULTRA-TURRAX® by introducing the silicone oil into water containing the surfactant and the hydrosoluble compounds. The emulsion was then introduced into a MICROFLUIDIZER-M110® colloidal mill.

The resulting emulsion was dried in a BUCHI® laboratory spray drier with a gas inlet temperature of 110° C.

Granules were obtained containing 78% by weight of oil.

Bringing the granules into contact with water caused them to disperse spontaneously and form an emulsion which after microscopic examination, had a granulometry which was close to that of the starting emulsion.

EXAMPLE 5

An emulsion was prepared with the following composition:

| Composition | % by weight |
|---|---|
| Silicone oil 47V300 | 40 |
| Sodium decyl D-galactoside uronate* | 2 |
| Urea | 2 |
| Sodium hexametaphosphate | 6 |
| Water | 50 |

A pre-emulsion was formed using an ULTRA-TURRAX® (IKA) by introducing the silicone oil into water containing the surfactant and the hydrosoluble compounds. The emulsion was then introduced into a MICROFLUIDIZER-M110T® colloidal mill.

The resulting emulsion was dried in a BUCHI® laboratory spray drier with a gas inlet temperature of 110° C.

Granules were obtained containing 80% by weight of oil.

Bringing the granules into contact with water caused them to disperse spontaneously and form an emulsion which after microscopic examination, had a granulometry which was close to that of the starting emulsion.

COMPARATIVE EXAMPLE

An emulsion was prepared with the following composition:

| Composition | % by weight |
|---|---|
| vaseline oil | 36 |
| n-octyl-β-D-glucoside* | 4 |
| Water | 60 |

*n-octyl-β-D-glucoside is sold by Sigma.

The binary water/surfactant phase diagram had a fluid isotropic phase at 25° C. up to a concentration of 60% by weight of surfactant, followed by a hexagonal type liquid crystal phase which was stable up to a temperature of 22° C. A cubic type liquid crystal phase which was stable up to a temperature of 52° C. then appeared at a concentration of 75% by weight of surfactant.

A pre-emulsion was formed using an ULTRA-TURRAX® by introducing the vaseline oil into water containing the surfactant. The emulsion was then introduced into a MICROFLUIDIZER-M110T® colloidal mill.

The average size of the emulsion, measured using a SYMPATEC® laser granulometer, was 0.5 µm.

This emulsion could not be dried without massive coalescence and granules could not be obtained.

EXAMPLE 6

A mixture of the following was prepared in a first 2 litre reactor provided with a frame paddle stirrer:
100 parts by weight of a sodium silicate solution, with a $SiO_2/Na_2O$ ratio of 2 and a 45% dry extract;
And 100 parts by weight of GLUCOPON 600 CSUP, 50% dry extract.

The mixture obtained was introduced dropwise, with stirring at 500 revolutions per minute, into a second 2 litre reactor provided with a frame paddle stirrer containing 65 g of RHODORSIL 20472 anti-foaming silicone.

The conductimeter of the medium was followed during the entire operation.

At the phase inversion point (observation of a sharp increase in conductimetry), addition of the solution of silicate and GLUCOPON 600 CSUP was stopped. Stirring was continued for several minutes.

An emulsion was obtained with an average size of 2 µm, with the following composition:
14.9% of silicate, dry weight;
33.6% of anti-foaming agent;
16.6% of GLUCOPON 600 CSUP, dry weight;
the complement to 100% with water.

This emulsion was then dried for one day on a glass plate in an oven at 80° C.

The product obtained was ground; a powder was obtained which was redispersible in the form of an emulsion.

EXAMPLE 7

Starting materials used:
polyacrylate, molecular weight 20000, containing 15% water;
GLUCOPON 600 SCUP, 50% dry matter;
RHODORSIL 20472 silicone anti-foaming agent.

A solution of 40% dry matter of polyacrylate was prepared by dissolving 150 g of polyacrylate in 100 g of water.

Using the method of Example 6, a mixture of 50 g of GLUCOPON 600 SCUP and 200 g of polyacrylate was prepared which was added in small portions to 100 g of RHODORSIL 20472 until the phase reversed.

The composition of the emulsion obtained was as follows:
16.6% of polyacrylate, dry matter;
38.7% of anti-foaming agent;
6.1% of GLUCOPON 600 SCUP, dry matter;
the complement to 100% with water.

This emulsion was then dried for one day on a glass plate in an oven at 80° C.

The product obtained could be ground; a powder was obtained with the following composition:
29.9% of dry polyacrylate;
59.2% of anti-foaming agent;
9.3% of dry GLUCOPON 600 SCUP;
1.5% of water.

This powder was redispersible in water in the form of an emulsion.

What is claimed is:

1. A water-redispersible granule obtained by drying an oil-in-water emulsion comprising:
    40 and 90 parts by weight per 100 parts of said granule of at least one active ingredient in the form of a hydrophobic liquid;
    7 to 50 parts by weight per 100 parts by weight of said granule of at least one hydrosoluble compound which can form a continuous solid film during drying which traps droplets of the hydrophobic active ingredient; water; and
    1 to 40 parts by weight per 100 parts by weight of said granule of at least one principal surfactant having a binary water-surfactant phase diagram comprises an isotropic phase which is fluid at 25° C. up to a concentration of at least 50% by weight of surfactant followed, at high concentrations, by a hexagonal, cubic or lamellar type liquid crystal phase which is stable up to 65° C.,
    said granule, after being further redispersed in water, producing again an oil-in-water emulsion.
2. A granule according to claim 1, wherein the principal surfactant is an anionic surfactant.
3. A granule according to the claim 2, wherein the principal surfactant is an anionic glycolipid surfactant.
4. A granule according to claim 3, wherein the glycolipid surfactant is an uronic acid derivative.
5. A granule according to claim 1, wherein the principal surfactant is a non ionic surfactant.
6. A granule according to claim 5, wherein the non ionic surfactant has a hydrophilic portion containing one or more saccharide unit(s) containing 5 or 6 carbon atoms.
7. A granule according to claim 6, wherein the non ionic surfactant containing one or more saccharide units is an alkylpolyglucoside.
8. A granule according to claim 1, wherein the hydrosoluble compound is urea, or a sugar.
9. A granule according to claim 8, wherein the sugar is an ose, an oside, or a highly depolymerised polyholoside.
10. A granule according to claim 1, wherein the hydrosoluble compound is one of the principal surfactants.
11. A granule according to claim 1, further comprising at least one supplemental ionic surfactant.
12. A granule according to claim 11, wherein the ratio of the concentrations of the principal surfactant to the supplemental surfactant is in the range 5 to 10 by weight.
13. A granule according to claim 1, wherein the ratio of the concentrations of the principal surfactant to the hydrosoluble compound is in the range 20/80 to 90/10.
14. A granule according to claim 1, wherein the emulsion has 10% to 70% by weight of dry matter.
15. A granule according to claim 14, wherein the drying is a spray drying.
16. A water-redispersible granule obtained by drying an oil-in-water emulsion comprising:
    40 and 90 parts by weight per 100 parts of said granule of at least one active ingredient in the form of a hydrophobic liquid;
    7 to 50 parts by weight per 100 parts by weight of said granule of at least one hydrosoluble compound which can form a continuous solid film during drying which traps droplets of the hydrophobic active ingredient. water; and 1 to 40 parts by weight per 100 parts by weight of said granule of at least one principal ionic surfactant having a binary water-surfactant phase diagram comprises an isotropic phase which is fluid at 25° C. up to a concentration of at least 50% by weight of surfactant followed, at high concentrations, by a hexagonal, cubic or lamellar type liquid crystal phase which is stable up to 65° C., said granule, after being further redispersed in water, producing again an oil-in-water emulsion.

17. A granule according to claim 16, wherein the principal surfactant is an amphoteric surfactant of the following general formula:

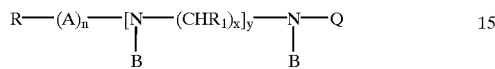

wherein R represents an alkyl or alkenyl radical containing 1 to 22 carbon atoms, $R_1$ represents a hydrogen atom or an alkyl radical containing 1 to 6 carbon atoms, A represents a (CO) or ($OCH_2CH_2$) group, n is 0 or 1, x is 2 or 3, y is 0 to 4, Q represents a radical $R_2$—COOM wherein $R_2$ represents an alkyl radical containing 1 to 6 carbon atoms, M represents a hydrogen atom, an alkali metal, an alkaline-earth metal or a quaternary ammonium group in which the radicals bonded to the nitrogen atom, which may be identical or different, are selected from hydrogen or an alkyl or hydroxyalkyl radical containing 1 to 6 carbon atoms, and B represents H or Q.

18. A granule according to claim 17, wherein the amphoteric surfactant comprises at least two carboxyl groups.

19. A granule according to claim 6, wherein the hydrosoluble compound is an alkali metal silicate or an alkali metal polymetaphosphate.

20. A granule according to claim 1, wherein the hydrosoluble compound is an organic polyelectrolyte prepared from polymerising monomers of the following general formula:

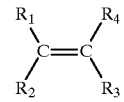

wherein $R_1$, $R_2$, $R_3$, and $R_4$, which may be identical or different, represent H, $CH_3$, $CO_2H$, $(CH_2)_nCO_2H$ where n=0 to 4.

* * * * *